United States Patent [19]

Ueda et al.

[11] 4,115,761
[45] Sep. 19, 1978

[54] METHOD AND DEVICE FOR RECOGNIZING A SPECIFIC PATTERN

[75] Inventors: Hirotada Ueda; Takeshi Uno, both of Sayama; Masakazu Ejiri, Tokorozawa; Sadahiro Ikeda, Tokyo; Shinji Matsuoka, Hitachi, all of Japan

[73] Assignee: Hitachi, Ltd., Japan

[21] Appl. No.: 766,486

[22] Filed: Feb. 7, 1977

[30] Foreign Application Priority Data

Feb. 13, 1976 [JP] Japan .................................. 51-14030
Feb. 13, 1976 [JP] Japan .................................. 51-14031

[51] Int. Cl.² ............................................. G06K 9/12
[52] U.S. Cl. ................. 340/146.3 AC; 340/146.3 AQ; 340/146.3 Q
[58] Field of Search ........... 340/146.3 AE, 146.3 AC, 340/146.3 AH, 146.3 AQ, 146.3 H, 146.3 F

[56] References Cited

U.S. PATENT DOCUMENTS

| | | | |
|---|---|---|---|
| 3,457,422 | 7/1969 | Rottmann | 340/146.3 F |
| 3,582,888 | 6/1971 | Abuls et al. | 340/146.3 AH |
| 3,643,215 | 2/1972 | Ingham et al. | 340/146.3 AH |
| 3,801,775 | 4/1974 | Acker | 340/146.3 H |
| 3,818,445 | 6/1974 | Neville | 340/146.3 AH |
| 3,852,573 | 12/1974 | Dolch | 340/146.3 H |
| 4,021,778 | 5/1977 | Ueda et al. | 340/146.3 AC |

Primary Examiner—Leo H. Boudreau
Attorney, Agent, or Firm—Craig & Antonelli

[57] ABSTRACT

This method for recognizing a specific pattern is characterized in a process of extracting feature parts wherein one or more certain feature parts of specific shape are extracted from an input pattern; the next feature part is then extracted from an extracting area which is determined from the position on the input pattern where a previous feature part was extracted; and in case that the next feature part fails to be extracted from the extracting area so determined, the initial condition is restored thereby extracting the feature part by successively limiting extracting areas.

13 Claims, 26 Drawing Figures (a)    (b)    (c)

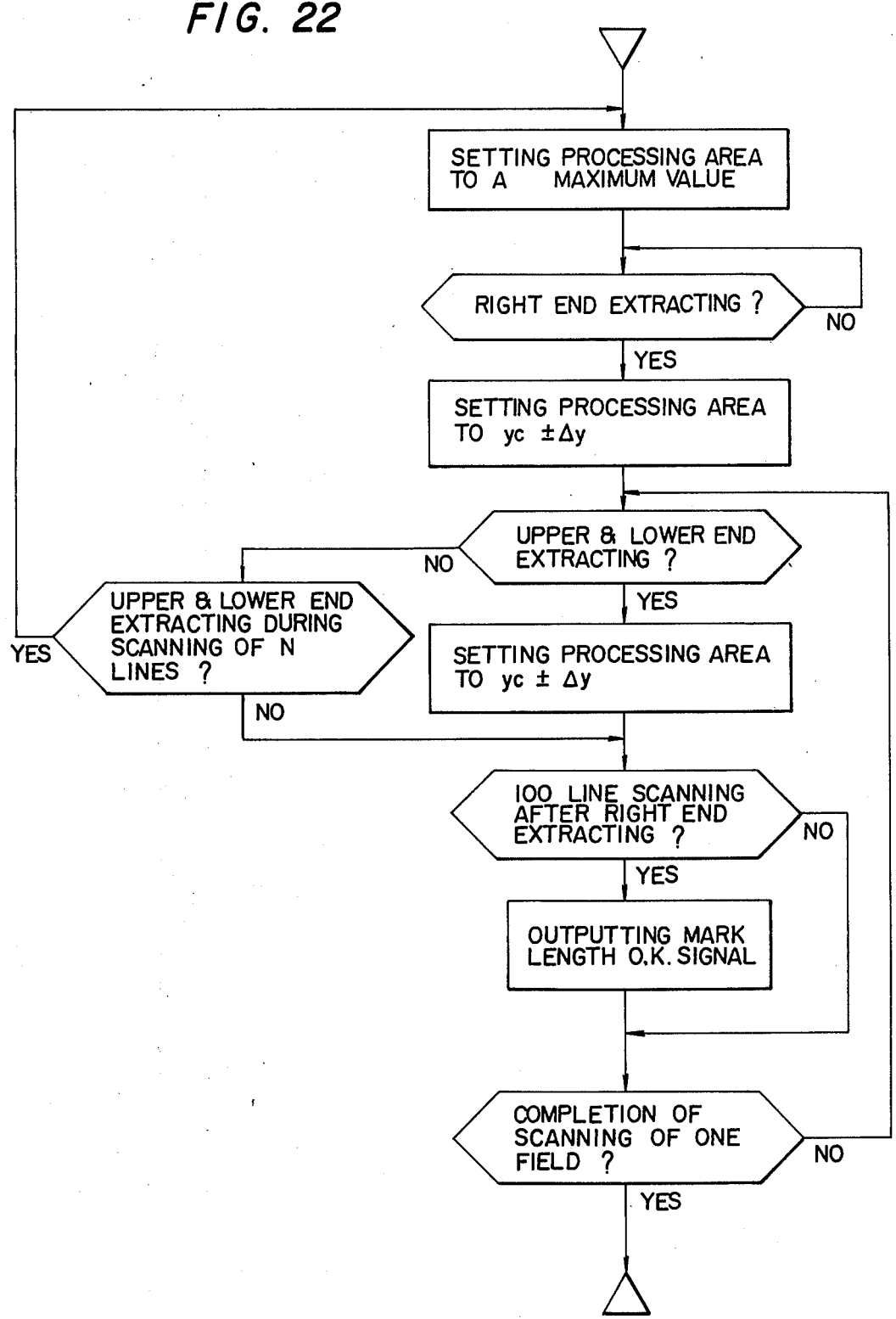

METHOD AND DEVICE FOR RECOGNIZING A SPECIFIC PATTERN

BACKGROUND OF THE INVENTION

This invention relates to a method and device for recognizing a specific pattern.

A well-known pattern recognition method employs the object pattern per se as a dictionary pattern or standard pattern which is stored and collated with an input pattern all over. With that method the quantity of dictionary pattern information becomes very large as the input pattern and the dictionary pattern take the form of binary coded information.

An improvement was proposed wherein an input pattern is tested for some partial patterns only, instead of processing the input pattern as a whole at a time, and when all of these partial patterns have been successfully extracted it is decided that the object pattern has been recognized.

With that improved method, however, errors will occur if impurity patterns exist having partial patterns similar to those of the object pattern, which can equally be extracted. The countermeasure to cope with such a difficulty results in a drawback of either a more complicated machine structure or a longer processing time due to necessary checking among all the extracted partial patterns.

SUMMARY OF THE INVENTION

An object of this invention is to provide a pattern recognition method with which the quantity of information to handle is very small and there is no fear of recognition errors.

Another object of this invention is to provide a pattern recognition device which is simple in structure and capable of performing recognition at a high speed.

A further object of this invention is to provide a character reader capable of reading very precisely information such as code patterns drawn within a mark of a specific external shape.

In order to achieve these objects, a feature of the present invention resides in a pattern recognition method wherein at least a first feature part of specific shape is extracted from an input pattern, a certain extracting area is determined from the position information of said extracted first feature part, and a second feature part of specific shape in said extracting area is extracted.

Further, another feature of this invention resides in a pattern recognition device comprising means for extracting the presence and the position of at least a first feature part of specific shape and means for extracting a second feature part of specific shape in a particular extracting area determined from the position information given by the first mentioned means.

BRIEF DESCRIPTION OF THE DRAWINGS

FIG. 22 is a flow chart illustrating an example of the operation of the mark recognition circuit in FIG. 11.

DETAILED DESCRIPTION OF THE PREFERRED EMBODIMENTS

Figure 1:
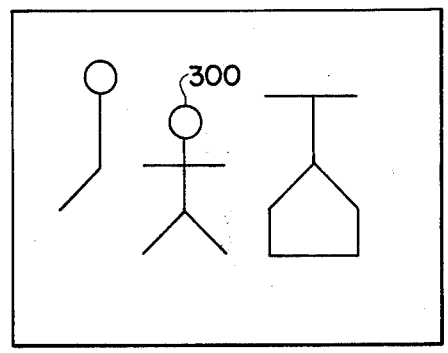
FIG. 1 to FIG. 6 are figures illustrating the principle of this invention.
Figure 2:
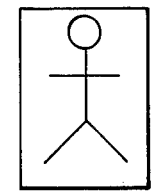

Initially the principle of this invention will be explained by a simple example. It is supposed that an input pattern of FIG. 1 is examined to recognize the presence and the position of a particular pattern 300 (referred to as the object pattern hereinafter) which may exist in the input pattern. According to a prior-art recognition method, the object pattern per se is stored as the dictionary pattern, as shown in FIG. 2 to be collated with an input pattern all over, the input pattern and the dictionary pattern being processed as digital patterns divided into meshes and quantized to binary values. As a result, even with such a simple figure that is supposed to be of 40 vertical picture elements by 30 horizontal picture elements, the quantity of the dictionary pattern information amounts to 1200 (= 30 × 40) bits or so.

Figure 3:
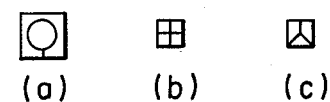

According to a feature of the recognition method of this invention, certain features of the pattern to be recognized (referred to as feature patterns hereinafter) are selected and extraction is tried for those feature patterns only. Thus, for example, a pattern of 10 by 10 picture elements as shown in FIG. 3 (a) and those of 6 by 6 picture elements as shown in FIG. 3 (b) and (c) are stored as the dictionary patterns. It follows that the information quantity to store per dictionary pattern is reduced to be 100 (= 10 × 10) bits for (a) and 36 (= 6

Figure 4:
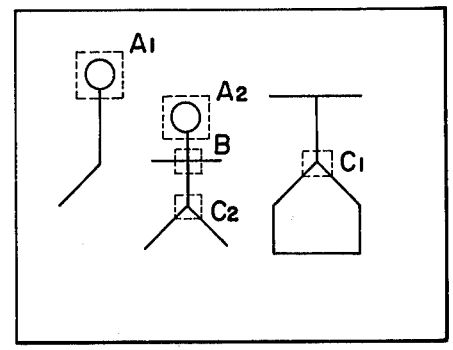

× 6) bits for (b) and (c) each, totaling 172 bits or so. Nevertheless, the recognition performance scarcely deteriorates if those feature patterns are combined for recognition. In FIG. 4, points $A_1$, $A_2$, B, $C_1$ and $C_2$ indicate the positions on the input pattern of FIG. 1 of those feature patterns which are extracted according to those dictionary patterns.

Assuming now that the input pattern is processed from top to bottom, after the point $A_2$ is extracted according to the dictionary pattern (a), a point at a given distance in a given direction is determined as the point B according to the dictionary pattern (b), and subsequently another point at a given distance in a given direction is determined as the point $C_2$ according to the dictionary pattern (c).

Thus the extraction of feature patterns according to the dictionary patterns (a), (b) and (c) proceeds so that a previous pattern is extracted before every succeeding pattern is extracted, in sequence. In case that a succeeding pattern fails to be extracted within a given area despite that a previous pattern has been extracted, the initial condition is restored to restart with the extraction of the pattern (a).

Figure 5:
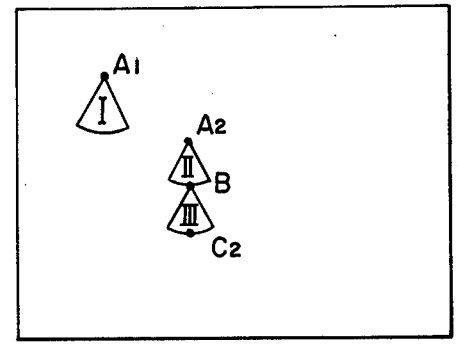

FIG. 5 illustrates the process in more detail. First, the pattern (a) is extracted at the point $A_1$, followed by the extracting operation for the pattern (b) within the area of a sector I having the center at the point $A_1$. The sector has been adopted for the extracting area in order to cover some rotation of the pattern. Permitting also some deviation of pattern size, the extracting operation for the pattern (b) extends to a distance so far from point $A_1$ that the pattern (b) is not expected to exist any more. In the present example, the pattern (b) fails to be extracted after all, and the initial condition is restored to restart with the extracting operation for the pattern (a).

This time the pattern (a) is extracted at the point $A_2$, and subsequently the pattern (b) is successfully extracted at the point B in a sector area II, followed by the extraction of the pattern (c) in a sector area III having the center at the point B. It is consequently ascertained that all the patterns (a), (b) and (c) are drawn up in proper directions at proper intervals, hence the decision that the object pattern 300 is present. Its position may be represented by the point B at which the pattern (a) has been extracted. Alternatively its position and attitude may be computed from the coordinates of the points $A_2$, B and $C_2$. It also should be noted that, in accordance with this process, useless operations on those extracting points such as the point $C_1$ of FIG. 4, which are irrelevant to the object pattern 300, are dispensed with, bringing forth the advantage of a shorter processing time.

Although the sector has been adopted in the above example as the shape of areas where the extracting operations for feature patterns take place, the shape may be rectangular, belt-like or any other.

Figure 6:
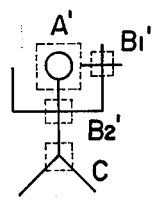

It is often effective to determine the operation area for a succeeding feature pattern from the extracting points of two or more feature patterns, rather than from a single feature pattern extracting point. Further, there may be some occasions on which the extraction of two or more feature patterns may conveniently be performed in parallel rather than the extraction of a single feature pattern only. An example of such operations is illustrated in FIG. 6.

When such an object pattern is to be recognized, it is more effective to determine the area where the pattern for the point $B_2'$ is to be sought from the coordinates of both the points A' and $B_1'$, where the respective patterns have been extracted according to the dictionary patterns of FIG. 3, thereby establishing a more definite area. The area where the pattern for the point C is to be sought may be determined from the point $B_2'$ in the same way as the previous example. If, however, the arrangement is such that the determination is made from all the points A', $B_1'$ and $B_2'$, the effect mentioned above will be enhanced.

The primary advantage of the recognition method in accordance with the principle described above is that the presence or absence as well as the position of the object pattern, though not decisive, is always kept known even in course of the recognition before the extraction of all the feature patterns is completed. Moreover, if an erroneous recognition proceeds with a spurious pattern, the situation can readily be detected to restore the initial condition for restart, preventing errors and failures in recognition almost completely. Therefore, the present method is very useful where it is required to read the internal information while recognizing the external shape, as the mark reading method described above.

Figure 7:
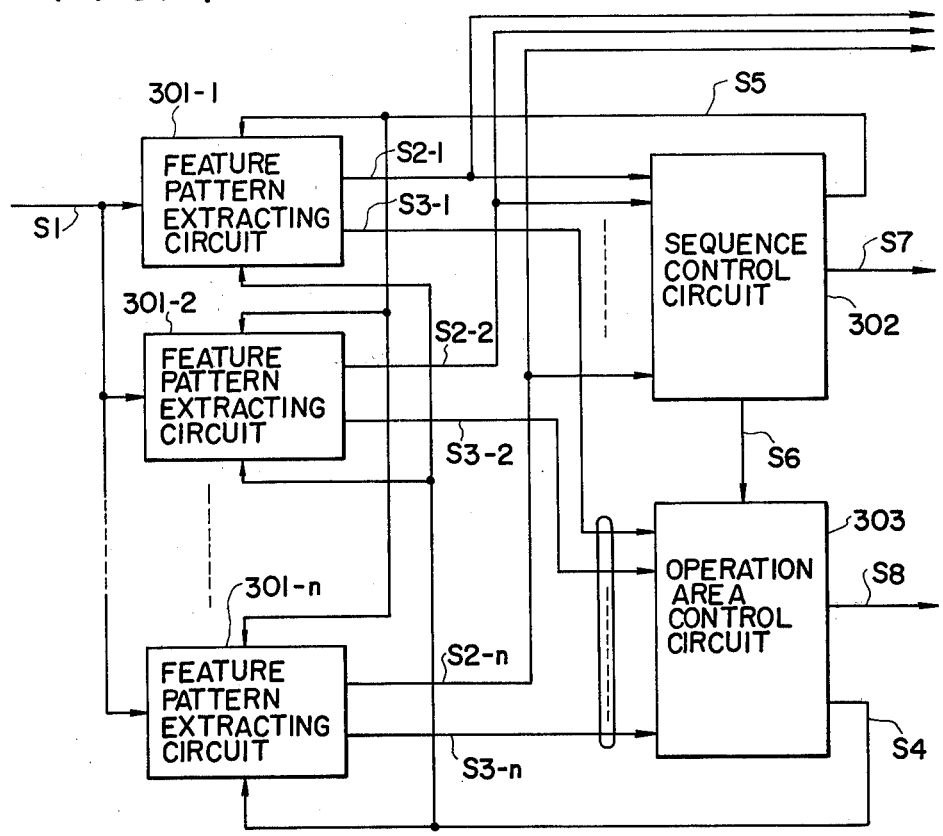
FIG. 7 is a block diagram showing an example of the basic structure of the pattern recognition device according to this invention.

The basic structure of a recognition device according to this invention will now be described. FIG. 7 shows the basic structure of a pattern recognition device according to the recognition method of this invention. This device consists of a feature pattern extracting circuit 301, a sequence control circuit 302 and an operation area control circuit 303, the function of each circuit being given in the following.

<Feature pattern extracting circuits 301-1~301-n>

①They extract feature patterns from an input pattern signal S1 and generate "extraction" signals S2-1–S2-n indicating their presence and "coordinates" signals S3-1~S3-n indicating their positions.

②Those outputs are generated only when both an "area" signal S4 from the operation area control circuit 303 and a "selection" signal S5 from the sequence control circuit 302 are applied.

③They are capable of feeding "extraction" signals S2-1~S2-n and so on, if necessary, to circuits other than this basic structure portion and outside the device also.

n feature pattern extracting circuits are provided corresponding to the number of the feature patterns, n, their functions being equal.

<Sequence control circuit 302<

①This circuit selects feature patterns to be extracted next depending on which feature pattern has been "extracted" by the feature pattern extracting circuit 301, the number of the selected feature patterns being one or a plural.

It feeds a "selection" signal S5 to a corresponding feature pattern extracting circuit.

The shape of the object pattern and the selection of feature patterns as well as the input method for the input pattern (such as the scanning sequence of the camera pickup arrangement) define the order of the respective feature patterns to be extracted. Therefore the above mentioned selection takes place according to that order.

②On extracting a feature pattern, it sends to the operation area control circuit 303 an "change-over" signal (a portion of S6) causing the latter to establish an area where the extracting operation is to be performed next as well as a signal (a portion of S6) indicating which feature pattern has been extracted.

③It sends a "set initial condition" signal (a portion of S6) to the operation area control circuit 303 at the beginning of recognition, and at the same time also feeds a "selection" signal S5 corresponding to a predetermined feature pattern to be extracted first. These signals set the device to the initial condition. Similar signals are also fed when the extraction of the feature pattern fails to continue in order, causing the device to resume the initial condition. This prevents errors and failures in recognition caused by the malfunction of the device due to patterns other than the object pattern.

④ When all the feature patterns to be extracted have been successfully extracted, a "completion" signal S7 is generated indicating that the recognition of the object pattern is completed.

⑤ It may be so arranged as to generate a signal indicating whether the device is in the initial condition or in course of recognition having already extracted some feature patterns. This output signal manifests the presence or absence of a probable object pattern in an intermediate step of recognition.

The outputs described in ④ and ⑤ above are fed to external circuits other than this basic structure portion.

<Operation area control circuit 303>

① On receiving a "set initial condition" signal (a portion of S6) from the sequence control circuit 302, it establishes an area where the first feature pattern extracting operation is to take place. The area established at this time may be the whole area of the input pattern, for example. Of course, if the area where the first feature pattern exists is previously known, the same area may be established.

② On receiving an "change-over" signal (a portion of S6) from the sequence control circuit 302, it establishes, by means of the coordinates of the feature patterns having been extracted at that time, an area where the extracting operation is to take place next. The area is established at this time according to the interval and direction between the feature patterns on the object pattern, taking account of the inclination, size deviation, distortion, etc.

③ It produces an "area" signal S4 from the area established above to feed the feature pattern extraction circuit 301. It is so arranged as to generate this "area" signal S4 only while the established area of the input pattern is being fed to a corresponding feature pattern extraction circuit. This is done, for example, by timing control synchronized with the scanning in the camera pickup arrangement as described later.

④ It feeds a "center coordinates" signal S8 of the area established above to external circuits or outside the device. This output indicates the local position of the object pattern in an intermediate step of recognition. Therefore, in the mark reader described later, for example, such operations as the recognition of mark inclination can be performed by making use of this signal.

This basic structure is highly flexible and the details of their respective circuits can be constructed variously. The feature pattern extracting circuit 301, for example, may be constructed of a so-called pattern matching circuit for collating an input pattern and a dictionary pattern with gate circuits for controlling the outputs according to the "area" signal S4 and the "selection" signal S5 associated therewith. Alternately, it is possible to extract a plurality of feature patterns with a single feature pattern extracting circuit 301. In this case the dictionary pattern in the feature pattern extracting circuit 301 is changed over according to the "selection" signal S5. Such an alteration results in a simplification of the circuit structure, because all the feature patterns need not be extracted at a time.

Further, it is possible to adopt a method with which no dictionary pattern is necessary for the feature pattern extracting circuit 301, by the use of the "upper and lower end detecting circuit" and the "character position detecting circuit" described later. Such a method is very effective for the reduction of device size including memory capacity.

The sequence control circuit 302 can readily be constructed mainly from storage elements such as flip-flops, and the operation area control circuit 303 mainly from comparators or the like. A reduction of the number of circuit elements can be expected if the sequence control circuit 302 and the operation area control circuit 303 are used in common. Such a structure is employed in an embodiment described later.

In the above description the basic structure of this invention is conceptually divided into three sorts of circuits with their input and output signals mentioned by convenient names for the sake of explanation. In practice, however, those are not necessarily distinguished clearly, and it is possible to remove some functions of the respective circuits, if the circumstance does not need them.

This invention is especially useful when applied to the recognition of images picked up by a Vidicon camera or by a camera employing a two-dimensional photodiode array. These cameras perform scanning both in the horizontal and vertical directions, there being a flyback time between every scan. Therefore, as in an embodiment described later, it is possible to arrange so that the extraction of a feature pattern is done during the effective view field scan within a horizontal scan, and during its flyback time the extracting operation area for the next single horizontal scan period is determined, resulting in a high-speed device capable of completing recognition after the scanning of a single field. It is alternatively possible to arrange so that the determination of an operation area is done during a vertical flyback time, thereby reserving a time long enough for the extraction of a feature pattern. In this case images of several fields may be devoted to a single recognition operation.

The recognition of two-dimensional patterns has mainly been described above. As is known by analogy to that, however, it is possible to apply this basic structure to the recognition of one-dimensional patterns, such as speech patterns, or other patterns.

By employing the structure described above, it is possible to construct a concise and high-speed recognition device with which there is no fear of errors and failures in the recognition of the object pattern even if it is buried among miscellaneous patterns.

Figure 8:
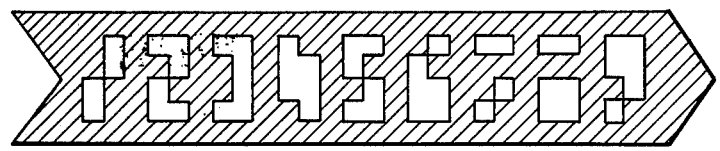
FIG. 8 is a plan view showing an example of the mark for use with a mark reader embodying this invention.

In the following is described in detail a mark reader which is an embodiment making the most of this invention. This exemplifying mark reader is so designed as to read a mark printed or stuck on the surface of an object such as a pasteboard box. FIG. 8 shows an example of the mark which carries a decimal number of $n$ digits (where $n$ may be any integer and $n = 9$ in this example).

Figure 9:
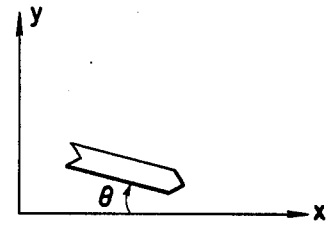
FIG. 9 is a coordinates graph illustrating the inclination of a mark.

The relation between a mark and the associated coordinate axes $x$ and $y$ is defined as illustrated in FIG. 9, where $\theta$ represents the inclination of a mark to the $x$ axis.

Figure 10:
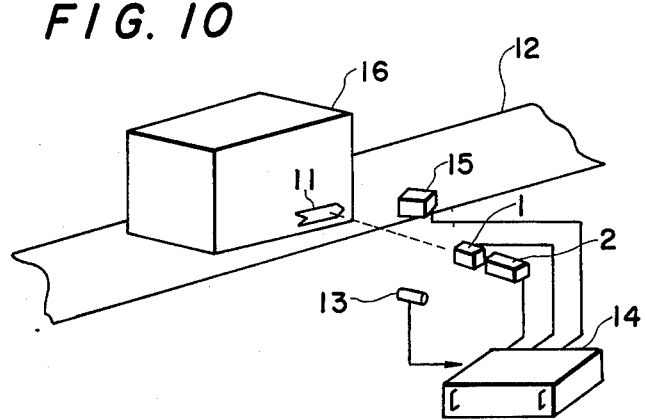
FIG. 10 is a schematic diagram showing an example of the mark reader according to this invention.

Referring to FIG. 10 which shows an example of the whole structure of a mark reader in accordance with the pattern recognition method of this invention, a mark 11 is stuck on an object 16 which is carried on a conveyor 12. A signal from an article arrival detector 13 initiates the operation of a recognition device 14 which in turn operates on the image of the mark 11 picked up by a camera 2 employing a Vidicon, for example, (the following description assumes the use of a Vidicon) to read a decimal number of n digits for output. An image rotating device 1 is inserted for rotating the image prior to the picking up to compensate the inclination $\theta$ of the mark. A flash lamp device 15 may be conveniently employed, when the object is moving swiftly, for obtaining the stationary image to avoid blurs due to after images in the camera. Therefore the flash lamp device 15 can be omitted if it is arranged that the object stops once in front of the camera.

Figure 11:
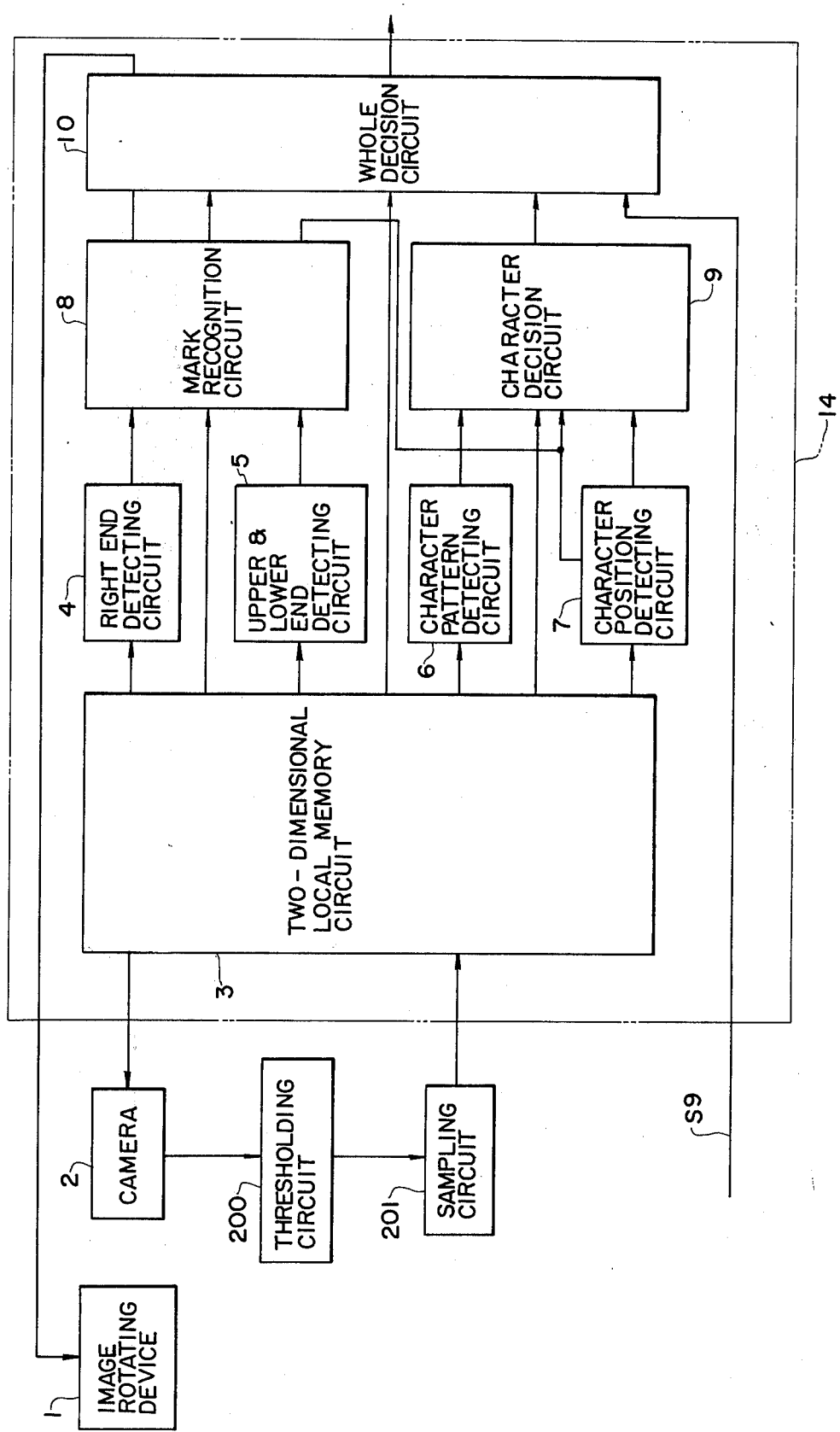
FIG. 11 is a block diagram showing the detail of a portion of the reader of FIG. 10.

FIG. 11 shows the basic structure of a mark reader according to the recognition method of this invention. The basic parts of this reader are a "part for recognizing the external shape" of the mark 11 consisting of a right end detecting circuit 4, upper and lower end detecting circuit 5 and an external shape or mark recognition circuit 8; and a "part for recognizing the character code pattern" consisting of a character pattern detecting circuit 6, a character position detecting circuit 7 and a character decision circuit 9. The former part extracts correctly the mark 11 drawn on the object and mingled among various characters and figures, and recognizes its position and inclination. The latter recognizes the information meant by the mark 11, making the most of the recognition results of the former.

Due to this structure the present invention is capable of providing a mark reader of a small size and yet achieving a high correct-reading ratio. For the compensation of the pattern rotation (mark inclination), for example, which is difficult to handle by hardware, the former part previously determines the inclination to effectuate the optical compensation of rotation, resulting in a considerable reduction of the rotation size in the latter. By a similar reason a high correct-reading ratio can be maintained even if the accuracy of mark position is not high.

The respective components of this reader will be described next. The image around the mark 11 on the object 16 which, via the image rotating device 1, is picked up by the Vidicon camera 2 is digitalized through a binary quantizing or threshold circuit 200 and a sampling circuit 201, and is subsequently sent to a two-dimensional local memory circuit 3 which in turn cuts out a plurality of local two-dimensional patterns (referred to as partial patterns hereinafter) and feeds them respectively to circuits 4~7 described in detail later. At the same time the circuit 3 derives from given clock pulses the center coordinates signal of each partial pattern which it has cut out as well as horizontal and vertical synchronizing signals. Those signals are fed to the circuits 4~10 and the camera 2. The cut-out position of those local patterns moves all over the image as the scanning in the Vidicon camera 2 advances.

The right end detecting circuit 4 operates on the given corresponding partial patterns, which have been cut out by the two-dimensional local memory circuit 3, to extract a pattern having a predetermined spread angle (about 120° as shown in FIG. 8), i.e. the right end pattern of the mark, and determines the y coordinates of the right end of this pattern. The upper and lower end detecting circuit 5 operates on the corresponding partial patterns to extract patterns each having a straight boundary between black and white areas, i.e. the upper and lower end patterns of the mark. It also determines from the upper and lower end positions of the mark so extracted the coordinates of the center in the y direction of the mark.

The character pattern extracting circuit 6 extracts, in like manner, the "code patterns" expressing digits "0"~"9" by processing the corresponding partial patterns. The character position detecting circuit 7 similarly operates on the corresponding partial patterns and extracts a timing signal indicating the center in the x direction of each digit of the "character code" patterns expressing an n-digit number.

In this manner, four sorts of feature patterns showing the features of various portions of the mark are extracted respectively. Due to the employment of the two-dimensional local memory circuit 3 as well as the speeding-up of each circuit by preparing its own special purpose hardware, it is possible to extract during the scanning of a single field of the Vidicon camera 2 all the feature patterns wherever they may be positioned on the image.

It is usual, however, that characters and figures other than the mark 11 are printed on the surface of the object 16. In consequence, there are included, among the patterns which are extracted by the four sorts of detecting circuits described above, both those which are extracted really from the mark and those which are not. The mark recognition circuit 8 and the character decision circuit 9 cooperate to distinguish between them by means of their coordinates etc. and select only those which satisfy the criteria for the mark shape, thereby recognizing the mark.

More specifically, the mark recognition circuit 8 recognizes the external shape of the mark based on the right end pattern of the mark extracted by the right end detecting circuit 4 together with the upper and lower end patterns extracted by the upper and lower end detecting circuit 5, and outputs the mark position and the mark inclination $\theta$. It also updates and stores on every horizontal scan of the Vidicon camera 2 the center coordinates in the y direction of the mark which are determined by the upper and lower end detecting circuit 5. (The y direction mentioned above is that which is shown in FIG. 8, and is taken so as to coincide with the horizontal scan direction of the Vidicon camera 2 as described later.) The center coordinates in the y direction of the mark coincides with the center coordinates in the y direction of the "character code" pattern and is used for determining the position on the image where the character position detecting circuit 7 and the character decision circuit 9 are to operate on.

The character decision circuit 9 also determines the position of the "character code" pattern by means of the x direction center coordinates of the "character code" pattern given by the character position detecting circuit 7 and the y direction center coordinates given by the mark recognition circuit 8, and selects among the outputs from the character pattern detecting circuit 6 only those which are in the area corresponding to said position to decide the "character code" of each digit.

The overall decision circuit 10 judges, after the extractions and decisions by the respective circuits, if the external shape of the mark satisfies completely the mark criteria, if the "character codes" of n digits have been read completely, and so on, and outputs the result of reading.

With the present mark reader the pickup operation takes place at least twice per mark. In the first pickup operation the mark recognition circuit 8 measures the mark inclination $\theta$ which is sent to the image rotating device 1 to compensate the inclination, followed by another pickup operation for both recognizing the external shape of the mark and deciding the "character code" patterns in parallel.

In case of recognizing a mark on a moving object it is necessary that the mark should be read when it enters completely the view field of the camera. The chance is decided on the basis of the mark position given by the mark recognition circuit 8. Thus the mark recognition alone is repeated through periodical pickup operations till the mark arrives at a predetermined position, when the "character code" patterns are decided and the result of reading is output. The sequence of these pickup and processing operations are controlled by the overall decision circuit 10.

The overall decision circuit 10 initiates the decision operation on receiving an article arrival signals 9 from the detector 13 in FIG. 10.

While the right end detecting circuit 4, the upper and lower end detecting circuit 5, the character pattern detecting circuit 6 and the character position detecting circuit 7 perform real-time processing, the mark recognition circuit 8 and the character decision circuit 9 are arranged so as to operate mainly in the horizontal flyback time and the overall decision circuit 10 mainly in the vertical flyback time. Consequently, after the completion of the inclination compensation by the image rotating device 1, all the processes are completed in a single field of the Vidicon camera (16.7 ms), leading to a high-speed reading.

The detailed structures and operations of the respective circuits are as follows:

<Image rotating device 1>

Figure 12:
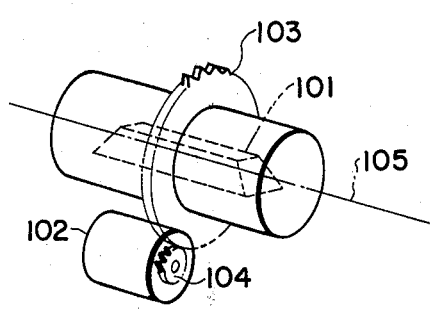
FIG. 12 is a slant view illustrating an exemplifying structure of the image rotating device shown in FIG. 10.

As shown in FIG. 12, this is an arrangement wherein a Wallaston prism 101 is rotated by a pulse motor 102 via gears 103 and 104. The Wallaston prism is a prism having a square optical axis section and trapezoidal sides. Having passed this prism the image rotates around the optical axis by twice the prism rotation angle. Moreover, the image is reversed into a reflection or mirror image. The image rotation angle is controlled by the number of pulses applied to the pulse motor 102. As described later, the recognition device 14 in FIG. 10 is so arranged as to measure and output $100 \times \tan \theta$ for a mark inclination $\theta$. Accordingly the step angle of the pulse motor and the gear ratio shall be selected so that the image is rotated by $\theta$ in response to that output.

<Vidicon camera 2>

This is an ITV camera which is adapted to an externally synchronized type, with the necessary external synchronizing signal being fed by the two-dimensional local memory circuit 3 in FIG. 11 in synchronism with the signal controlling the memory circuit 3. The image or picture signal from the Vidicon camera 2 is processed as an image dispersed two-dimensionally. The image has already been dispersed with respect to the vertical direction. With respect to the horizontal direction, however, it is sampled with a period of 6 MHz for dispersion. As a result the view field of the Vidicon camera is divided into meshes of 240 in the vertical direction by 320 in the horizontal direction, each mesh being referred to as a picture element [pe].

Figure 13:
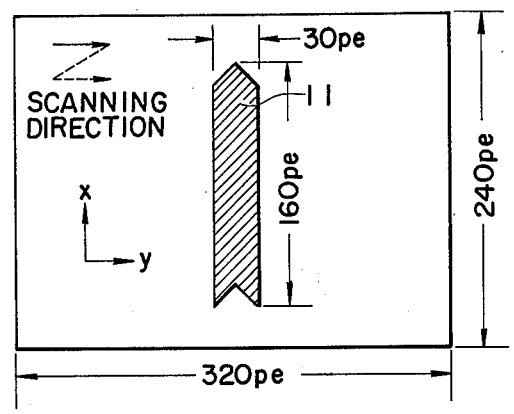
FIG. 13 is a chart illustrating the relation of a mark in the view field of the Vidicon camera in FIG. 10.

The relation in the present device between the view field of the Vidicon camera and the mark 11 is shown in FIG. 13, wherein the horizontal scan direction of the camera is made normal to the horizontal direction ($x$ direction) of the mark. Thus the Vidicon camera 2 proceeds with scanning in the direction of the "character code" pattern alignment, allowing the two-dimensional local memory circuit 3 successively to cut out the "character code" patterns digit by digit. In consequence, it suffice for the character pattern detecting circuit 6 to repeat the same process for the "character code" patterns of $n$ digits. Since a mark is picked up through the Wallaston prism, the coordinates $x$ and $y$ shown in FIG. 9 become as is shown in FIG. 13 on the picked-up image.

<Two-dimensional local memory circuit 3>

Figure 14:
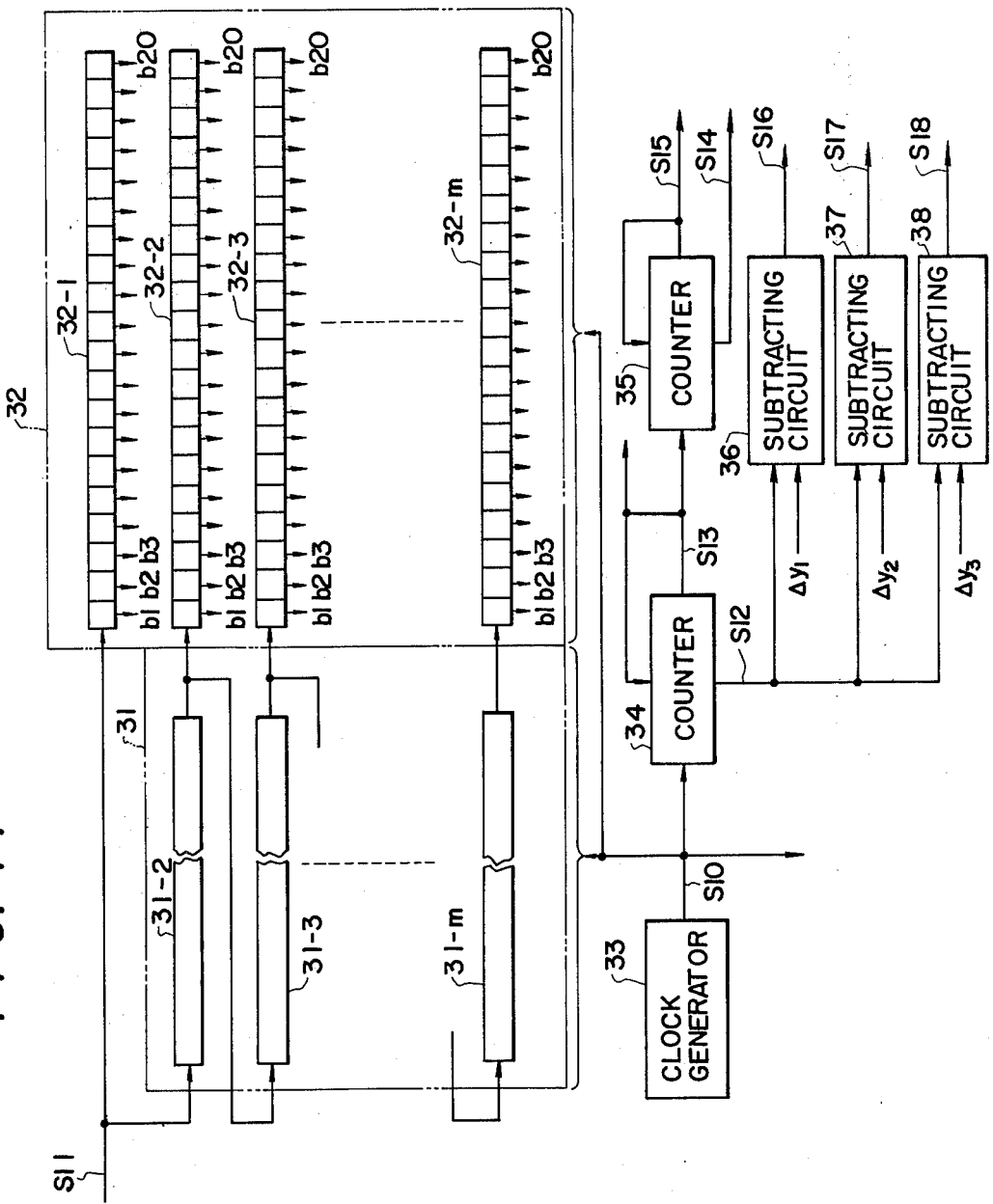
FIG. 14 is a block diagram showing an example of the circuit structure of the two-dimensional local memory circuit in FIG. 11, FIG. 15 and FIG. 16 are figures illustrating the function of the upper and lower end detecting circuit in FIG. 11.

An example of the basic structure of this circuit is shown in FIG. 14, wherein 31 and 32 represent shift register group, 33 a clock generator, 34 a horizontal counter, 35 a vertical counter and 36 38 subtracting circuits. The shift register groups 31 and 32 consist of shift registers $31\text{-}2 \sim 31\text{-}m$ and $32\text{-}1 \sim 32\text{-}m$, respectively, through which binary image pattern signals S11 from the sampling circuit 201 in FIG. 11 are shifted by means of clock pulses S10 from the clock generator 33. The shift register group 32 cuts out partial patterns from an image pattern. The outputs from the respective stages (bits) $b1 \sim b20$ of the respective shift registers $32\text{-}1 \sim 32\text{-}m$ are fed as partial patterns to the detecting circuits $4 \sim 7$ in FIG. 11, where only those bit outputs which correspond to the partial patterns requisite to the respective detecting circuits are utilized.

On the other hand, the clock pulses S10 from the clock generator 33 are counted by the horizontal counter 34 to generate as an output signal S12 the $y$ coordinates of the present cut-out position (the coordinates on the image pattern of a signal being received by the upper left end bit of the register group 32). On the occurrence of an overflow, the counter 34 generates an output signal S13 which is available as a resetting signal for the counter 34 and as a horizontal synchronizing signal to be sent to the counter 35 and further to external circuits. The counter 35 counts the horizontal synchronizing signals S13 to generate the $x$ coordinates of the present cut-out position as an output signal S14. On the occurrence of an overflow, the counter 35 generates a signal S15 which is available as a vertical synchronizing signal while resetting the counter 35.

The $y$ coordinates signal S12 from the counter 34 is applied to the subtracting circuits $36 \sim 38$. Those subtracting circuits 36, 37 and 38 are prepared corresponding to the detecting circuits 4, 5 and 7, respectively, for subtracting deviation signals $\Delta y1$, $\Delta y2$ and $\Delta y3$, respectively, of predetermined values from the $y$ coordinates signal S12 to obtain the $y$ coordinates of the center of the present cut-out position for the partial pattern requisite to each detecting circuit. Those signals $S13 \sim S18$ described above are available in circuits described later. The clock signal S10 from the clock generator 33 is used as a sampling pulse in the sampling circuit 201 in FIG. 11.

<Right end detecting circuit 4>

This circuit utilizes the partial patterns from the memory circuit 3 to produce the right end detection signal indicating the extraction of the right end of the mark and the $y$ coordinates signal of the right end of the mark. This circuit receives the center $y$ coordinates signal S16 and the partial pattern outputs from the shift register group 32 in the memory circuit 3, with the outputs from all the shift registers $32\text{-}1 \sim 32\text{-}m$ of the shift register group 32, for example, being used as those partial patterns.

As for this right end detecting circuit itself, an usual pattern matching circuit for collating an input pattern (partial pattern) and a dictionary pattern to produce the position output when they coincide, hence the omission of its detailed description.

In order to extract the right end pattern of the mark (a pattern having a given spread angle) regardless of the mark inclination, a detecting circuit as is disclosed in U.S. Pat. application Ser. No. 710417, now U.S. Pat. No. 4,021,778, for example, may be employed.

<Upper and lower end detecting circuit 5>

Figure 15:
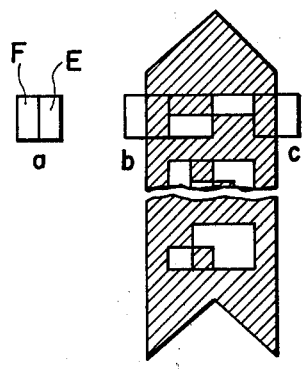

The partial pattern to be processed by this circuit are two congruent rectangular patterns E and F adjacent to each other, as shown in FIG. 15. The position of those partial patterns which are cut out by the two-dimensional local memory circuit 3 moves a →b→c in the horizontal direction, as depicted. Of course it subsequently moves also in the vertical (downwards in FIG. 15) direction as the vertical scan proceeds. In the position b, shown in the figure, where the boundary between the partial patterns E and F lies just on the lower end of the mark as is shown in FIG. 8 (corresponding to the left end in FIG. 15 wherein the image is reversed), it happens that E is a all "black" pattern while F all "white". On the other hand, in the position C where the boundary lies just on the upper end (the right end in FIG. 15) of the mark, E is a all "white" pattern while F all "black". Consequently it is possible to detect the upper and the lower ends of the mark by examining those conditions.

Figure 16:
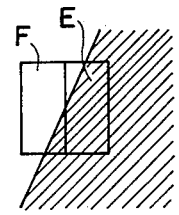

In actual image patterns, however, an all "black" or all "white" pattern can not always be observed due to noises. When the mark is inclined an all "black" or all "white" pattern is not attained also, as shown in FIG. 16. Therefore it may be as well to adopt the following decision:

Let the conditions be defined as follows:

Condition 1 — $e > T_1$
Condition 2 — $f > T_1$
Condition 3 — $T_2 < e + f < T_3$ where $e$ is the number of the "white" picture elements in the partial pattern E, and $f$ the number of the "white" picture elements in F. It shall be judged that the upper end has been extracted when both the conditions 1 and 3 are simultaneously satisfied, whereas the lower end has been extracted when both the conditions 2 and 3 are simultaneously satisfied.

The condition 1 is for the decision of the upper end and the condition 2 the lower end. By moderating the condition of all "black" and all "white" so as to choose $T_1$ larger than 80% of the area of a rectangle, it is possible to eliminate the influence of noises and mark inclinations (as far as $\theta = 20°$). The condition 3 is for the accurate extraction of the upper and lower end positions. It is derived from the fact that the value $e + f$ equals the area of a rectangle when the upper or lower end of the mark is accurately caught, as understood from FIG. 8. For that condition $T_2$ and $T_3$ are chosen 0.9 and 1.1 times, respectively, as large as the rectangle area, taking also into account of noises.

Although the upper and lower ends of the mark can be extracted in this manner, an image may include a lot of partial patterns resembling to those patterns, which will equally be extracted. Therefore the present circuit subsequently decides if the upper and lower ends have been extracted at an appropriate interval to ascertain that the upper and lower ends of the mark have really been extracted. Further, it computes the center coordinates in the y direction of the mark from the y coordinates of the cut-out position center fed at this time by the two-dimensional local memory circuit 3.

Figure 17:
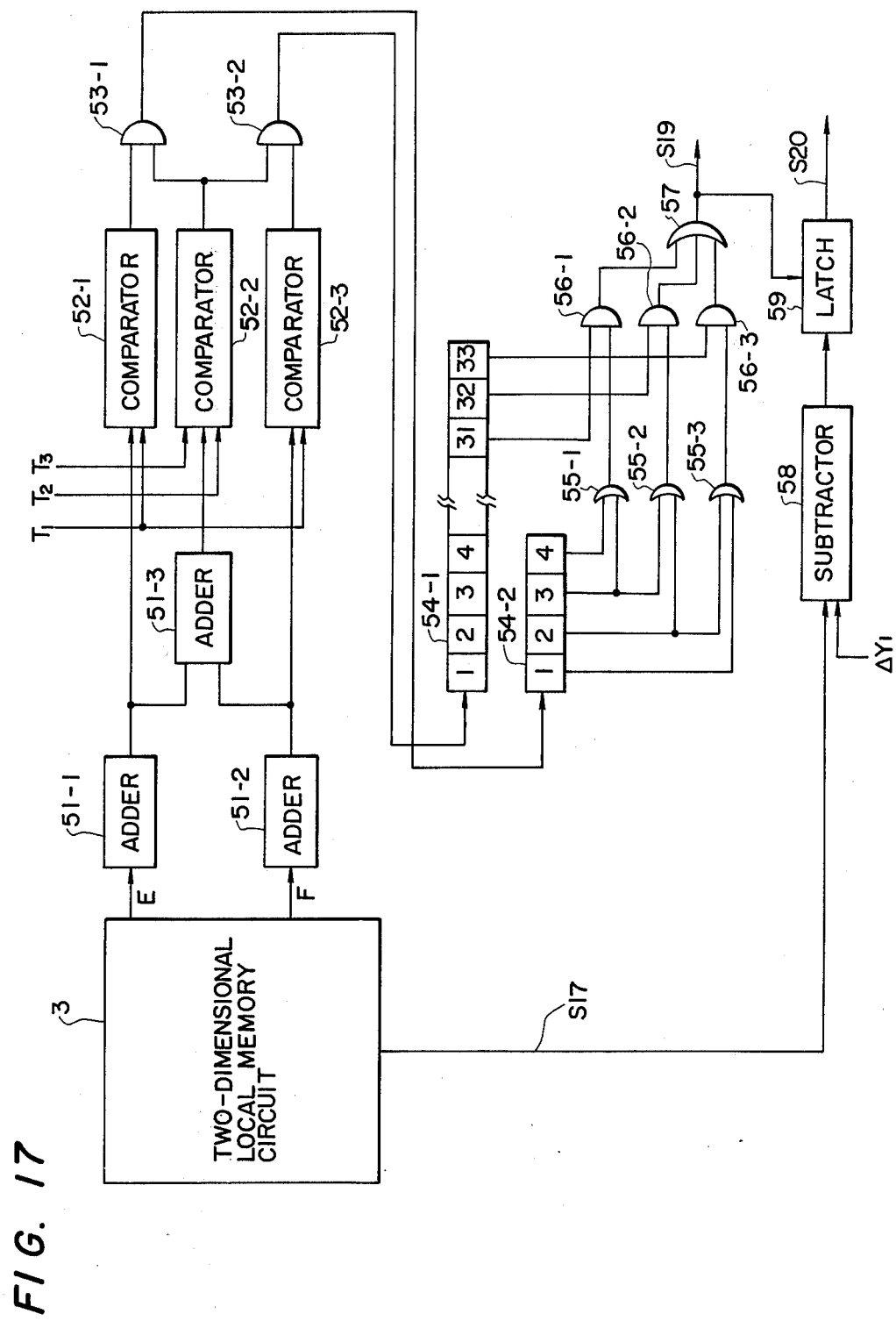
FIG. 17 is a block diagram showing an example of the circuit structure of the upper and lower end detecting circuit in FIG. 11, FIG. 18 and FIG. 19 are figures illustrating the detecting function of the character position detecting circuit in FIG. 11.

In accordance with this principle, the circuit is constructed as shown in FIG. 17. Entering into details, it is supposed, for example, that the partial pattern E, among the partial patterns cut out by the two-dimensional local memory circuit 3, consists of the outputs from the bits b5~b8 of the shift register 32-1~32-10 and the partial pattern F the outputs from the bits b1~b4 of the same shift registers. Adders 51-1 and 51-2 receive these E and F partial pattern bits to count out the number of "white" picture elements in E and F, i.e. $e$ and $f$, respectively, while an adder 51-3 counts out $e + f$. Their respective results are fed to comparators 52-1~52-3 for the decision on the conditions 1~3 described above. Finally, AND circuit 53-1 generates a "1" output when the upper end is detected, otherwise a "0", while AND circuit 53-2 generates a "1" output when the lower end is detected, otherwise a "0". These outputs are successively applied to shift registers 54-1 and 54-2, respectively, and shifted bit by bit as the image scan advances picture element by picture element.

The shift register 54-2 is connected to OR circuits 55-1, 55-2 and 55-3 whose outputs are applied, together with outputs from the shift register 54-1, to AND circuits 56-1, 56-2 and 56-3. The purpose of these circuit is to decide if the upper and lower ends of the mark have been extracted at an appropriate interval, permitting some deviation. As the camera view field is set so that the interval between the upper and lower ends may become 30 pe, it is usual, as understood from FIG. 13, that the lower end of the mark in its actual position is detected before the upper end is detected when the scanning of the Vidicon camera advances 30 pe in the horizontal direction. Accordingly, a "1" signal which has been sent from the AND circuit 53-2 on the extraction of the lower end is shifted to the 32'nd bit of the shift register 54-1 to reach the AND circuit 56-2 when a "1" signal which has been sent from the AND circuit 53-1 on the extraction of the upper end is shifted to the 2'nd bit of the shift register 54-2 also to reach the same AND circuit 56-2. As a result the AND circuit 56-2 receiving a "1" at both its two inputs generates a "1" output, which appears via an OR circuit 57 as an upper and lower end detection signal S19.

In case that the interval between the upper and lower ends is 29 pe, an "1" indicating the extraction of the lower end reaches the 32'nd bit of the shift register 54-1 when a "1" indicating the extraction of the upper end reaches the 3'rd bit of the shift register 54-2. It also followed that the outputs of the OR circuit 55-2 and the AND circuit 56-2 become a "1" successively, causing the OR circuit 57 to generate a "1". In this manner it is decided that the interval between the upper and lower ends falls within 27pe~32pe to generate the "upper and lower end extraction" signal S19.

On the other hand, the center y coordinates signal S17 of the partial pattern cut-out position given by the two-dimensional local memory circuit 3 minus $\Delta Y_1$ is produced by a subtracting circuit 58 and stored temporarily in a latch circuit 59 to form an "center y coordinates" signal output S20. Here $\Delta Y_1$ is the difference between the center coordinates in the y direction of the true mark and the center y coordinates of the partial pattern cut-out position indicated by the two-dimensional local memory circuit 3 when the "upper and lower end detection" signal S19 is generated, and takes the value of 17 pe corresponding to the delay due to the shifting in the shift registers 54-1 and 54-2. The present circuit is organized so that the shift amount of the upper end extraction and lower end extraction signals "1" within the shift registers 54-1 and 54-2 before the decision of the interval between the upper and lower ends of the mark may vary according to the interval between the upper and lower ends. It consequently is possible always to obtain the correct center y coordinates of the mark without varying $\Delta Y_1$.

<Character pattern detecting circuit 6>

This circuit extracts "character code" patterns "0" through "9" arranged in the mark making use of the partial patterns cut out by the local memory circuit 3, that is, for example, those which are extracted from all the bits of the shift register group 32, and sends the corresponding character pattern $i$ ($i = 0, 1, 2, \ldots, 9$) detection signals to the character decision circuit 9. As in the case of the right end detecting circuit 4, a usual pattern matching circuit for collating an input pattern and a dictionary pattern may be employed.

<Character position detecting circuit 7>

Figure 18:
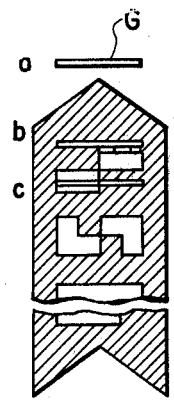

The partial pattern to be processed by this circuit is, as shown in FIG. 18, a linear pattern G of which the length is equal to the length in the y direction of the "character code" pattern representing the digits "0"~"9" (e.g. 20 pe). The position of this partial pattern G which is cut out by the two-dimensional local memory circuit 3 moves $a \rightarrow b \rightarrow c$ as the vertical scanning of the Vidicon camera proceeds. As for the position in the y direction, the processing takes place with respect to only the mark center on the basis of the mark center coordinates given by the mark recognition circuit 8. The partial pattern G is derived from the outputs from the bits b1~b20 of the shift register 32-8, for example, of the shift register group 32 in the memory circuit 3.

Figure 19:
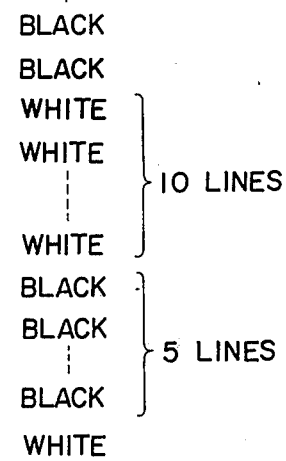

In the position C where the partial pattern G is on a "character code" pattern, at least half of the picture elements constituting the pattern G are "white". On the other hand, in the position b where the partial pattern G is on the mark out of the "character code" pattern, the partial pattern G becomes all "black". The view field of the Vidicon camera is set so that the width in the x direction of the "character code" pattern in the mark may be 10 pe and the interval between the "character code" patterns 5pe. Consequently, after by threshold operations taking the whole as a "white" pattern if more than a certain area is of "white" picture elements, the partial pattern G changes, when viewed in the vertical scan direction, as shown in FIG. 19. By deciding on this condition the position in the x direction of the "character code" pattern can be known.

Figure 20:
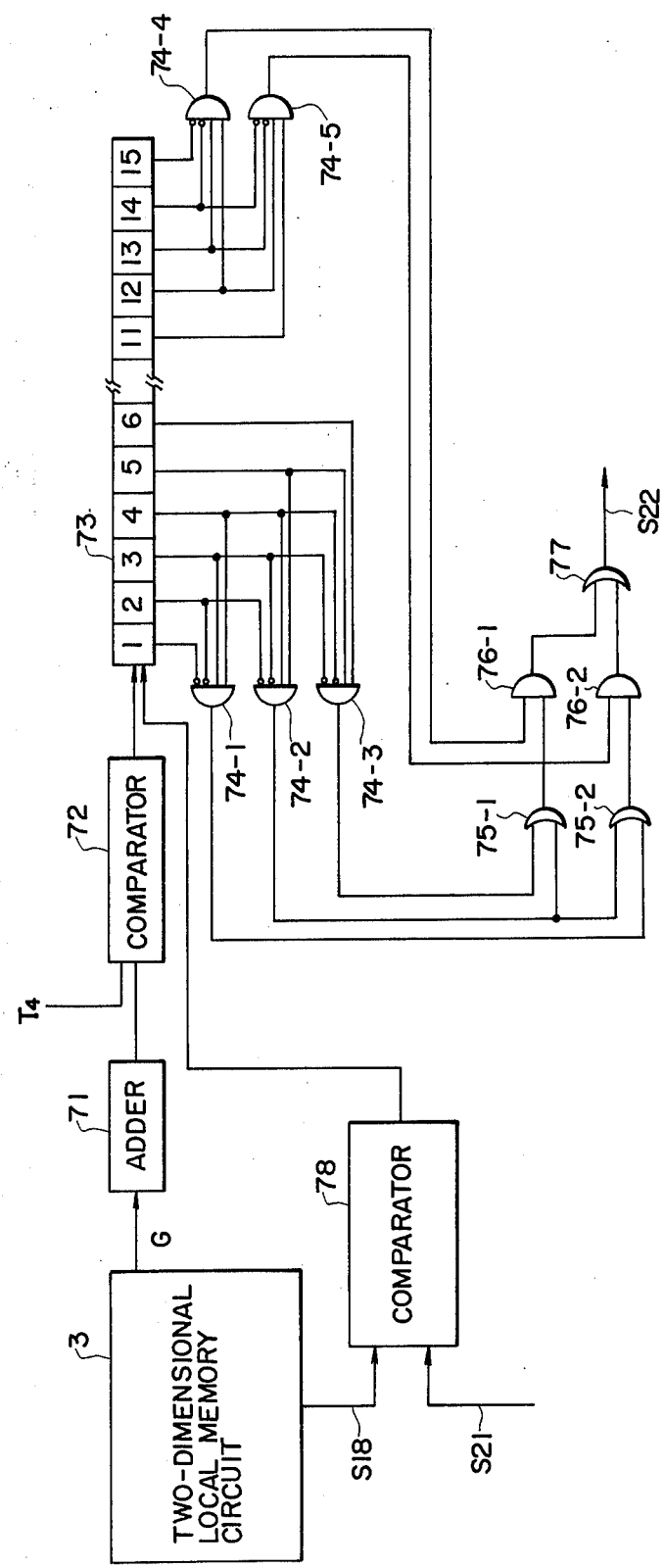
FIG. 20 is a block diagram showing an example of the circuit structure of the character position detecting circuit in FIG. 11.

FIG. 20 shows the structure of this circuit, which is organized, as the upper and lower end detecting circuit 5 described above, so as to cope with noises and pattern size deviations. An adder 71 counts "white" picture elements in the partial pattern G from the local memory circuit 3, and a comparator 72 subsequently decides whether the partial pattern G is "white" or "black" as a whole. By setting the threshold $T_4$ 80% or so of the smallest "white" picture element number of the partial pattern G on the code pattern, e.g. 8 picture elements, the influence of noise can be eliminated. The comparator 72 generates a "1" output when the pattern is "white", and a "0" when "black". This output should be sent into a shift register 73 only when the partial pattern G is correctly at the y coordinate center of the mark.

For this purpose a comparator 78 compares the "cut-out position center y coordinates" signal S18 fed from the two-dimensional local memory circuit 3 with the "character pattern center y coordinates" signal S21, causing shift signals to be applied to the shift register 73 only when those coordinate signals coincide. As a result, the shift register 73 shifts a step at every horizontal scan of the Vidicon camera 2, thereby successively recording in the shift register 73 the "white" and "black" pattern changes of the partial pattern G.

Five AND circuits 74-1~74-5 extract, from the "white" and "black" pattern informations of the partial pattern G stored in the shift register 73, their changing points, i.e. the pattern 0011 or 1100. (In FIG. 20 these AND circuits are expressed with their associated inverters omitted). Although the interval between these changing points ought to be 10 pe as shown in FIG. 19, it is decided that the center in the x direction of the "character code" pattern has been detected when the interval is 8~11 pe, permitting some deviation. For that purpose two OR circuits 75-1 and 75-2, two AND circuits 76-1 and 76-2 and an OR circuit 77 are employed. These circuits operate as the above described circuits 55-57 in the upper and lower end detecting circuit shown in FIG. 17 to generate an "character position detection" signal S22.

As described above, the output of this circuit, "character position detection" signal S22, is a timing signal indicating that the image scanning has advanced to the x direction center of the "character code" pattern of each digit.

<Mark recognition circuit 8>

This circuit recognizes the external shape of the mark from the right end pattern of the mark extracted by the right end detecting circuit 4 and the upper and lower end pattern of the mark extracted by the upper and lower end detecting circuit 5, and derives "character pattern center y coordinates," "mark right end y coordinates," "mark right end x coordinates," "mark inclination," etc as its outputs.

The principle of the external shape recognition will be described first. As understood from the view field of the Vidicon camera shown in FIG. 13, the mark right end is extracted first, followed by the extraction of the mark upper and lower ends as the image scanning proceeds. The extraction of the mark upper and lower ends continues till the image scanning reaches the mark left end. Therefore, it is possible to recognize the external shape of the mark by deciding if an upper and a lower end patterns have been extracted immediately after the extraction of a right end pattern, and if, in addition, the extraction of upper and lower end patterns has continued for the mark length (corresponds to some 100 horizontal scan lines, for example). Those decisions take place in every horizontal scan. An additional decision if the y coordinates center of every extracted pattern succeeds without a sudden change serves to prevent recognition errors.

Figure 21:
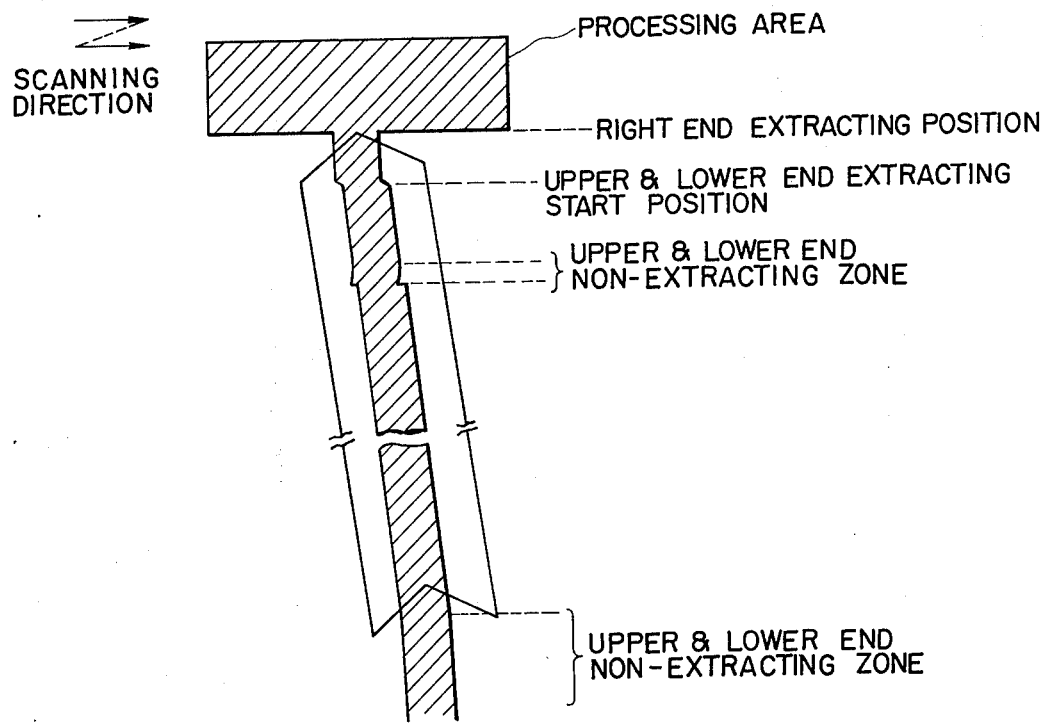
FIG. 21 is a figure illustrating the function of the mark recognition circuit in FIG. 11.

FIG. 21 illustrates the mark recognition process according to the principle described above, and FIG. 22 is its flow chart wherein the hatched portion depicts the processing area. At the start of the image scanning the processing area is fully spread in the horizontal scan direction (y direction). When a mark right end is subsequently extracted the processing area is limited to an area of the mark right end y coordinates yr plus or minus $\Delta y$ ($yr \pm \Delta y$). When a mark upper and a lower ends are subsequently extracted in that area the processing area is renewed for the mark center y coordinates yc plus or minus Δy (yc ± Δy), proceeding with a similar process in every succeeding horizontal scan.

In case the extraction of the upper and lower ends discontinues, the same processing will be continued if the extraction restarts in less than N scans. If, however, the discontinuation lasts till the Nth scan the area at the start is restored to restart with the extraction of a right end. It is thus possible to restart the mark recognition correctly even if the right end detecting circuit 4 commits an error in extraction due to a print other than the mark. As for parameters, Δy = 3 and N = 5 or so may be chosen to prevent recognition errors due to noises and prints other than the mark.

When the position deviation of the mark 11 picked up by the Vidicon camera 2 is previously known and that within a smaller area than the view field of the camera, the processing area at the start is set so as to covery only the existing area of the mark 11, instead of full in the horizontal scan direction. By varying Δy on the respective extraction of right, upper and lower ends a more strict decision can be achieved.

In parallel with the above described processings this circuit decides the mark length and measures the mark inclination θ. In more detail, the length is decided according to whether or not the upper and lower ends have continued to be extracted for 100 horizontal scans (permitting discontinuations less than N) after the extraction of the right end. Further, 100 × tan θ is obtained, as described later, from the difference between the "center y coordinates" and the "right end y coordinates" for the 100th horizontal scanning line after the extraction of the right end.

Figure 23:
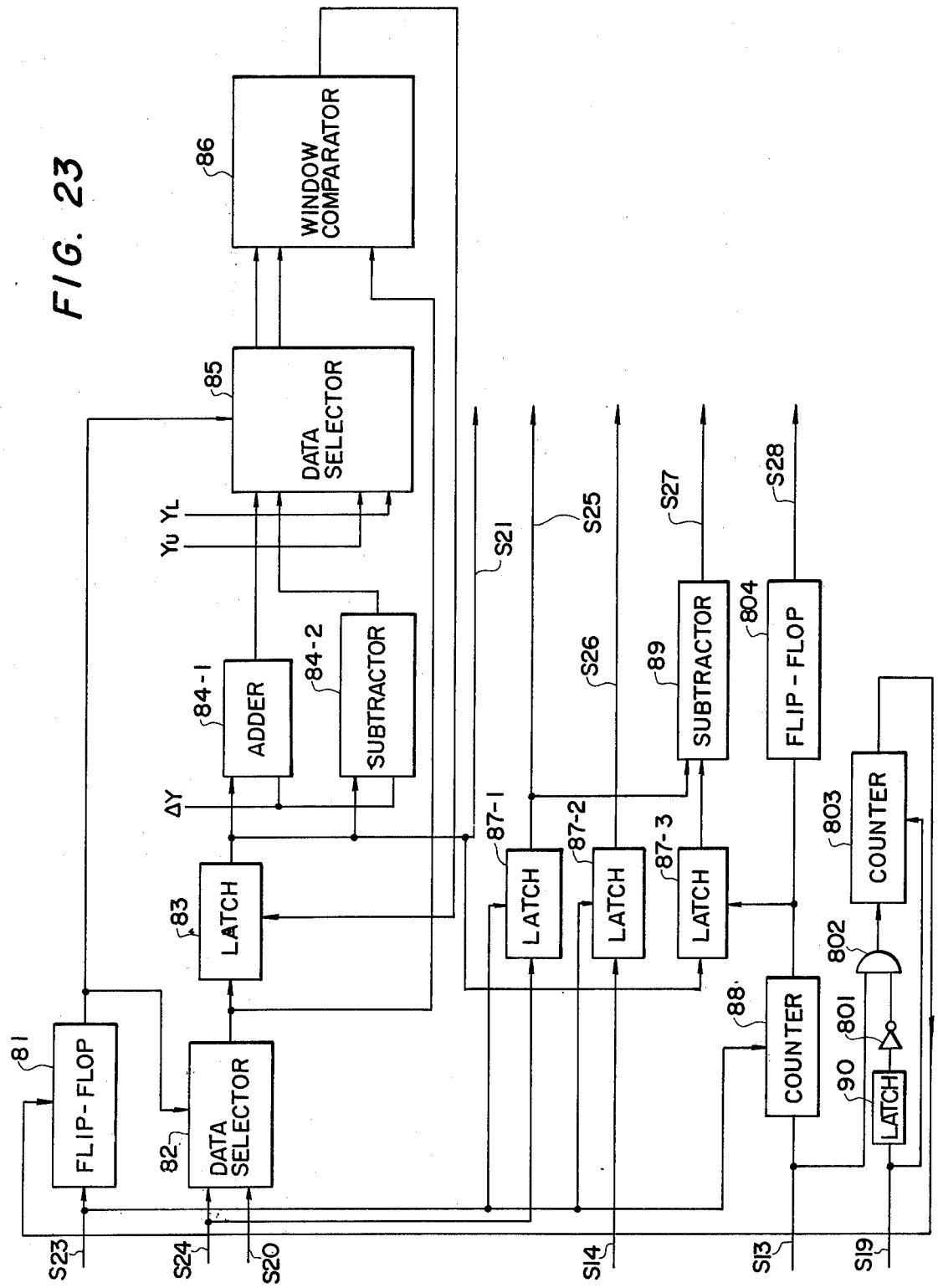
FIG. 23 is a block diagram showing an example of the circuit structure of the external shape recognition circuit.

The structure of this circuit is shown in more detail in FIG. 23. A flip-flop 81 is, for example, a D-type flip-flop for memorizing whether the right end has been extracted. It is set by the "right end detection" signal S23 from the right end detecting circuit 4 in FIG. 11 and is reset by the output of the counter 803 which counts out the discontinuation of the upper and lower end extraction lasting for N horizontal scans. This flip-flop 81 is of course reset at the start of the image scanning.

The setting of the processing area described above is performed by a data selector 82 through a window comparator 86. A latch 83 temporarily stores either the "right end y coordinates" signal S24 from the right end detecting circuit 4 or the "center y coordinates" signal S20 from the upper and lower end decting circuit 5. Which of the two is stored is decided by the data selector 82 which in turn is switched by the output of the flip-flop 81, the "center y coordinates" signal S20 being latched when the right end has been extracted, otherwise the "right end y coordinates" signal S24. They are stored, however, only when the upper and lower ends or the right end is extracted within the processing area.

An adder 84-1 and a subtractor 84-2 adds y to or subtracts Δy from the y coordinates in the latch 83 to obtain the upper and lower limit coordinates of the processing area. Those coordinates are sent, via a data selector 85, to the window comparator 86, which in term applies a trigger signal to the latch 83 causing the same to sore the y coordinates of a pattern extracted by the right end detecting circuit 4 or the upper and lower end detecting circuit 5, if this y coordinates is in the processing area.

The data selector 85 is switched by the output of the flip-flop 81 so as to supply the window comparator 86 with the upper and lower coordinates Yu and YL of the processing area full in the horizontal scanning direction before the extraction of the right end, and the processing area given by the adder 84-1 and the subtractor 84-2 after the extraction of the right end. The flip-flop 81 is so arranged to generate its output after the right end y coordinates signal S24 is stored via the data selector 82 to the latch 83. By this structure the above described recognition process is mechanized.

Latches 87-1 and 87-2, being triggered by the right end detection signal S23, store the right end y coordinates signal S24 and the cut-out position x coordinates signal S14 from the local memory circuit 3 in FIG. 14 and generate a mark right end y coordinates signal S25 and a mark right end x coordinates signal S26. A latch 87-3, on the other hand, being triggered by the output of a counter 88, stores the coordinates output of the latch 83 and generates a center y coordinates signal of the mark 100 horizontal scans after the extraction of the right end. For this purpose the counter 88 counts the horizontal synchronizing signals S13 (the output of the counter 34 in FIG. 14) after the detection of the right end. When the count reaches 100 it triggers the latch 87-3 to store and at the same time to output the coordinates kept in the latch 83 at that time. An subtractor 89 subtracts the center y coordinates for the 100th horizontal scan (counted from the detection of the right end) fed by the latch 87-3 from the right end y coordinates fed by the latch 87-1 to produce a signal corresponding to 100 tan θ as an inclination signal S27. The coordinates output of the latch 83 is sent as a character code pattern center coordinates signal S21 to the character position detection circuit 7 and the character decision circuit 9 in FIG. 11. The output of the counter 88 sets a flip-flop 804, which in turn generates on mark length OK signal S28 indicating that a position corresponding to the mark length away from the right end extraction position is reached.

A latch 90, an inverter 801, an AND circuit 802 and a counter 803 serve to count the scanning lines for which the upper and lower end detection is being interrupted till a predetermined count N, when the flip-flop 81 is reset to restore this mark recognition circuit 8 to the initial condition. In more detail, the latch 90 latches the upper and lower end detection signal S19 from the OR gate 57 in FIG. 17. When this detection signal S19 is "0", that is, when no upper and lower ends are detected, an "1" output of the inverter 801 opens the AND gate 802 to supply the horizontal synchronizing signal S13 to the counter 803 for counting. When the counter 803 reaches to a predetermined count N its output resets the flip-flop 81. On the other hand, when the detection signal S19 is "1", that is, when the upper and lower ends are detected, the counter 803 is reset while the "0" output of the inverter 801 closes the AND gate 802 to inhibit the horizontal synchronizing signal S13 from being supplied to the counter 803.

<Character decision circuit 9>

This circuit collates the center y coordinates of the "character code" pattern obtained by the character position detecting circuit 7 and the mark recognition circuit 8 with the character position detection signal as well as the "character code" pattern extracted by the character pattern detecting circuit 6 to decide and store them digit by digit.

Figure 24:
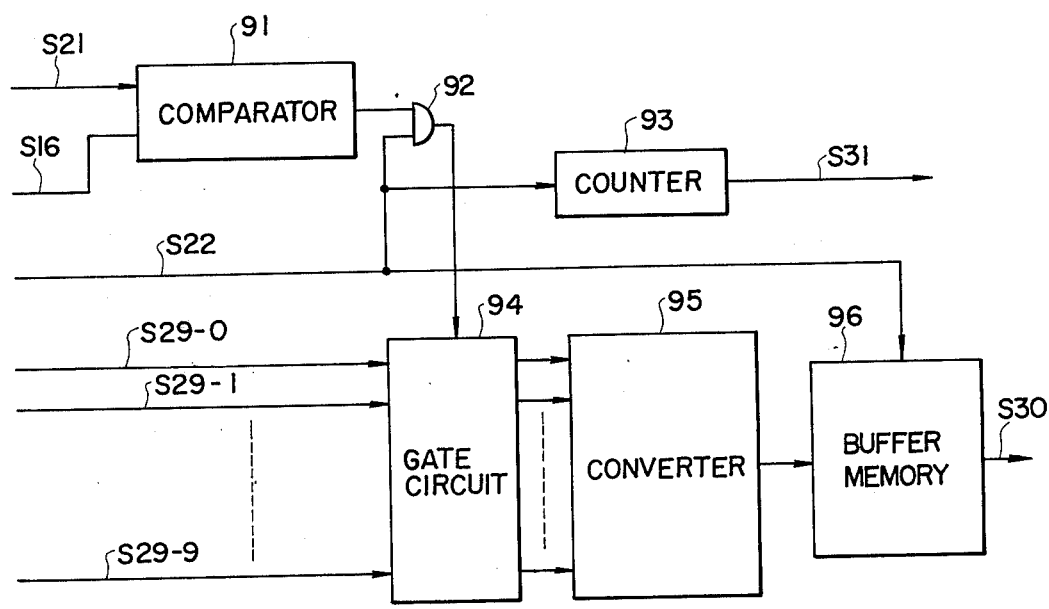
FIG. 24 is a block diagram showing an example of the circuit structure of the character decision circuit in FIG. 11.

FIG. 24 shows the structure of this circuit. A comparator 91 compares the "character pattern center y coordinates" signal S21 sent from the mark recognition circuit 8 with the "cut-out position center $y$ coordinates" signal S16 of the partial pattern given by the two-dimensional local memory circuit 3, and when they coincide generate an "1" output which indicates the timing in the $y$ direction when a partial pattern to be fed to the character pattern detecting circuit 6 is correctly cut out on the center coordinates of the "character code" pattern.

An AND circuit 92 opens the gate circuit 94 when both the output described above and the "character position detection" signal S22 from the character position detecting circuit 7 become "1". The signal S22 is a timing signal indicating the center in the $x$ direction of the "character code" pattern. As a result the outputs of the character pattern detecting circuit 6, that is, ten sorts of signals S29-0 ~ S29-9 indicative of "character pattern 0 detection" ~ "character pattern 9 detection," are sent to the converter 95 which is a decimal-to-binary converter circuit for converting, in accordance with which one of the "character pattern $i$ detection" inputs ($i = 0, 1, 2, \ldots, 9$) is "1," $i$ into binary form.

The above described process takes place repeatedly on the "character code" pattern of every digit as the image scanning proceeds. It will be repeated nine times in the present example. Every time the processing of a digit is finished the output of the converter 95 is stored in a buffer memory 96 for the final output as a "character being read" signal S30. A counter 93 serves to count the digit number of the processed "character code" pattern and putout as a "character number" signal S31.

<Overall decision circuit 10>

This circuit makes the overall decision on the results of the extraction and decision by the circuits described above and puts out the reading result. It also controls the sequence of the operation of each circuit.

The present device is organized so that it is capable of recognizing the object mark 11 where the body 16 bearing the mark 11 shown in FIG. 10 is either moving or arranged so as to stop once in front of the camera. Since the former case can easily be understood by analogy from the latter case, here is described the latter case only.

Figure 25:
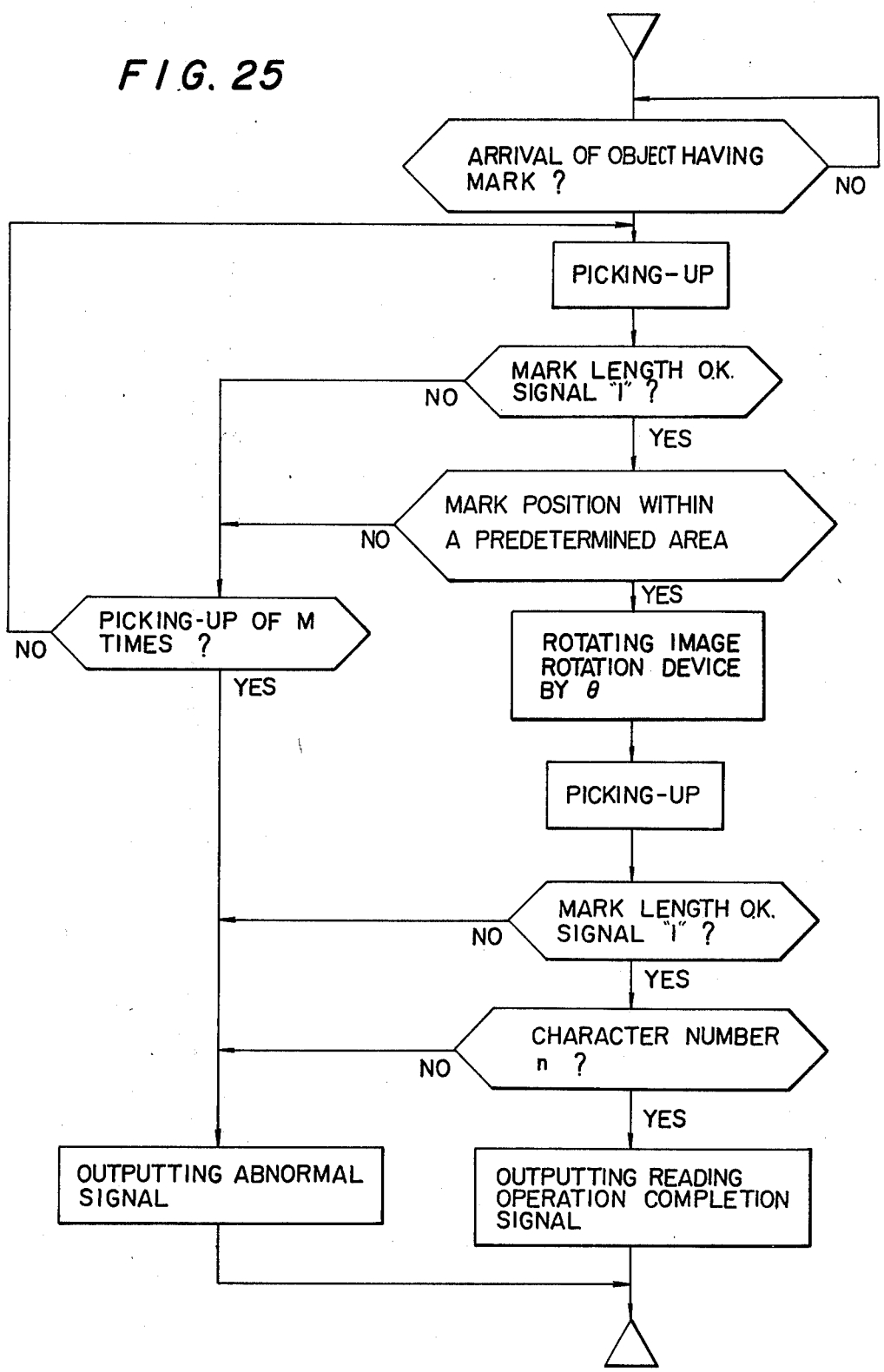
FIG. 25 is a flow chart illustrating an example of the operating process of the overall decision circuit in FIG. 11.

FIG. 25 is a flow chart illustrating the process performed by the present circuit. This circuit decides if the respective circuits have processed over the whole length of the mark, if the mark is in the readable position, if the "character codes" having been read complete the required $n$ digits, and so on. When there is any abnormal condition about them an "abnormal" signal is produced, and if all is well a "reading completion" signal as well as a "character being read" signal is put out. It also repeats to pickup till the mark position on the image comes to the readable position. When the mark inclination is measured it sends a "mark inclination" together with an "image rotation" signal which is a timing signal for image rotation to the image rotating device. Subsequently it picks up once more and processes the image having the mark inclination compensated to read "character codes." When those repeated pickup operations take place M times an "abnormal" signal is generated and the device resumes the initial condition to prepare for the arrival of the next article. In the foregoing, M may be 3 or so depending on circumstances.

Figure 26:
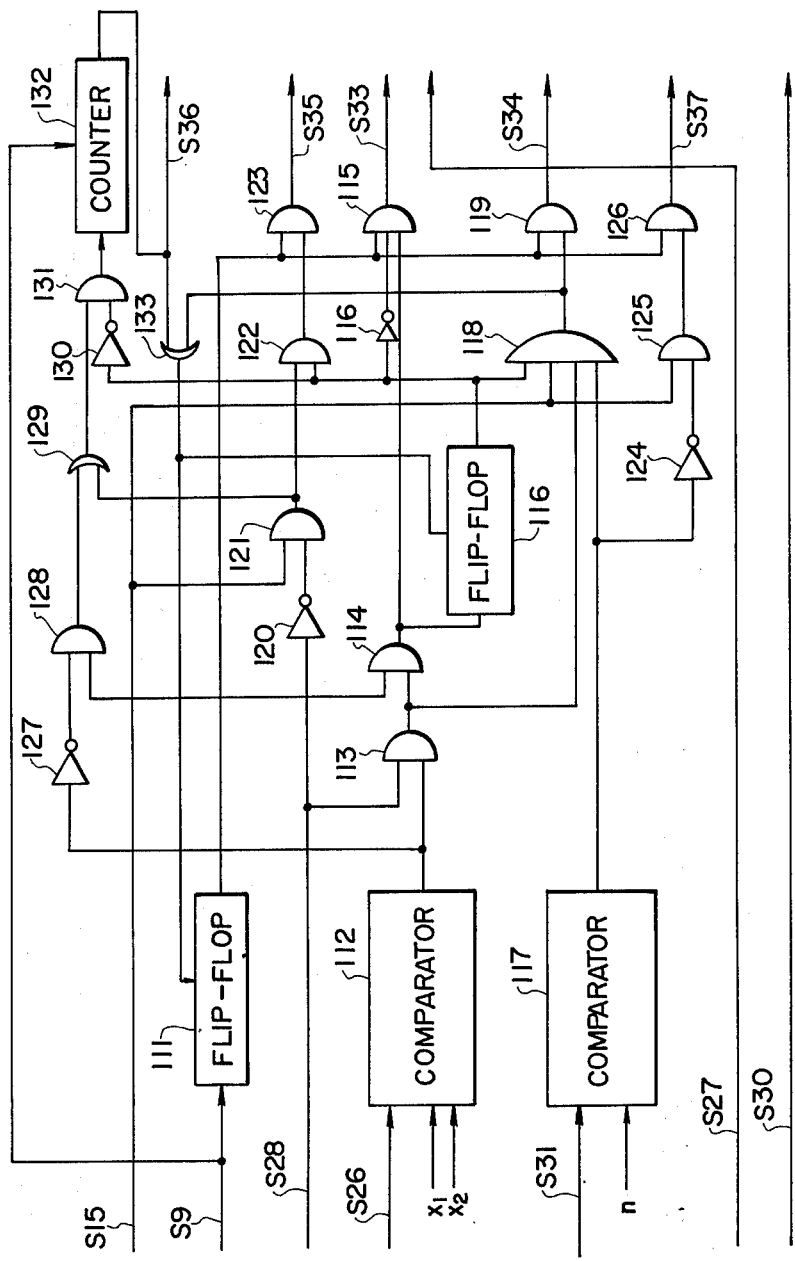
FIG. 26 is a block diagram showing an example of the circuit structure of the overall decision circuit in FIG. 11.

FIG. 26 shows the structure of this circuit, the operation of which is as follows. A flip-flop 111 is set by the "article arrival" signal S9 from the article arrival detector 13 in FIG. 10 and is reset on the completion of reading. A flip-flop 116 serves to memorize whether the image rotation has been done. These serves to determine the operational condition of the present device.

A comparator 112 generates a "1" when the "mark right end $x$ coordinates" signal S26 from the mark recognition circuit 8 falls within the area defined between $X_1$ and $X_2$ in order to decide, as described above, if the mark position on the image is the readable position.

When both the output of the comparator 112 and the "mark length OK" signal S28 from the mark recognition circuit 8 become "1," it is detected by an AND circuit 113. This result is sent out, via an AND circuit 114 and 115, as an "image rotation" signal S33. The AND circuit 114 serves to generate the "image rotation" signal S33 only when the "vertical synchronizing" pulse S15 from the local memory circuit 3 is "1," that is, when the pickup of one field is completed.

The AND circuit 115 similarily serves to generate the "image rotation" signal S33 only when the output of the flip-flop 111 is "1" indicating that the article has arrived but the reading is not completed, and further only when the output of a flip-flop 116 is not "1" indicating that the image rotation has not yet been done. The "image rotation" signal S33 and the "mark inclination" signal S7 are sent to the image rotating device 1 in FIG. 11. It is thus possible to perform the image rotation only once when the mark recognition is normally finished.

AND circuits, 121, 118, 125, 128, 122, 123, 119, 126, etc. perform functions similar to those of the AND circuits 114 and 115, hence the omission of their details.

A comparator 117 serves to ascertain that the "character number" signal S31 from the character decision circuit 9 is equal to the number of the "character code" pattern, $n$, within the mark. The output of that comparater and the output of the AND circuit 113 which decides the mark position as described above are applied, together with the output of the flip-flop 116 and the "vertical synchronizing" signal S15, to the AND circuit 118, whose output is sent out, via the AND circuit 119, as a "reading completion" signal S34. Thus the "reading completion" signal is produced only when all the circuits have operated in accordance with the normal sequence till the completion of mark reading.

The portion which consists of an inverter 120 and an AND circuit 121 produces a "1" output when the processing fails to be performed over the whole length of the mark. This output is sent out via AND circuits 122 and 123 as an "abnormal B" signal S35. The portion which consists of an inverter 127 and an AND circuit 128 generates an "1" output when the mark is not in the readable position. This output and the output of the AND circuit 121 described above are fed, via the portion which consists of an OR circuit 129, an inverter 130, an AND circuit 131, to a counter 132. It is thus possible to count the number of the pickup operations repeated by reason that either the processing failed to be performed over the whole mark length or the mark was not in the readable position. When this count reaches M an "abnormal A" S36 is generated from the counter 132.

The portion which consists of an inverter 124 and AND circuits 125 and 126 detects that the "character number" having been read fails to reach $n$ to produce an "abnormal C" signal S37. By classifying "abnormal" signals into A, B, C, etc as exemplified above, it is possible, on the occurrence of an abnormal reading operation, to guess at its cause.

An OR circuit 133 serves to reset the flip-flop 111 when the mark reading is completed or the pickup operation is repeated M times to set the device to the initial condition again.

The foregoing is the description of an embodiment. Since the constitution of this invention is highly flexible and it is believed that those skilled in the art can readily find substitutive means, they are not described here.

As for the components employed, this invention is also highly flexible. For example, any pickup arrangement can be employed in place of the Vidicon camera 2. It is possible to employ a one-dimensional photo-diode array for which the electrical scanning is performed in the y direction while the movement of the conveyor 12 functions as the scanning in the x direction. The image rotation can be carried out either mechanically by rotating the camera or electrically by changing the focus potential of the Vidicon camera 2.

The mark is not confined to the one having those "character code" which are shown in FIG. 8, but any similar pattern can readily be read by modifying a portion of the circuitry. Further, the patterns are not restricted to those which represent digits but patterns representing other characters and symbols can be included.

As described above, this invention provides a recognition device achieving a maximum performance in a shortest processing time, consistent with a minimum size of hardware. It implements a novel function of always outputting the presence or absence of the object of recognition, its position and shape in course of recognition, and is very effective when industrially applied.

We claim:

1. In a device for recognizing the presence of a specific object pattern on an information pattern, a recognition method comprising:
   a first step of inputting the information pattern including an object pattern having at least a first and a second feature parts of specific shape;
   a second step of extracting information from said information pattern indicating the presence of said first feature part of specific shape and its position coordinates on said information pattern;
   a third step of determining a certain extracting area on the basis of said position coordinate information of said first feature part of specific shape and extracting said second feature part of specific shape existing in said extracting area and the position coordinates therefor;
   a fourth step of determining at least a first coordinate identifying the position of a third feature part from the position coordinates of at least one of said first and second feature parts;
   a fifth step of sequentially cutting out partial patterns in an area related to said first coordinate determined in said fourth step from among the information picked up in said first step and determining the position coordinates for these partial patterns;
   a sixth step of extracting the presence and at least a second coordinate identifying the position of said third feature part from among said sequentially cut out partial patterns;
   a seventh step of recognizing feature parts contained in said sequentially cut out partial patterns and generating a signal representative thereof; and
   an eighth step of selecting a signal output generated in said seventh step as the desired character recognition signal when the position coordinates of said sequentially cut out partial pattern in which said feature recognized in said seventh step is located substantially matches the position coordinates of said third feature part determined in said fourth and sixth steps.

2. A recognition method as defined in claim 1, further comprising:
   a ninth step of restoring the initial condition and extracting said first feature of specific shape when said second feature part of specific shape fails to be extracted from said extracting area during said third step.

3. A pattern recognition device comprising
   input means for inputting an information pattern including an object pattern having a plurality of feature parts of specific shape,
   plurality of extracting means for extracting information indicating the presence of a feature part of specific shape in a certain extracting area of the information pattern from said input means and its position on said information pattern,
   sequence control means for receiving the information of the feature part of specific shape extracted by said extracting means, and selectively causing a given one of said extracting means to operate next, and
   area control means for determining, from the position information extracted by said extracting means, said next certain extracting area for said extracting means.

4. A pattern recognition device comprising
   first means for inputting an information pattern including an object pattern having at least one character pattern within a mark of a specific shape,
   second means for extracting, from the information pattern from said first means, information indicating the presence of said mark and its position on said information pattern,
   third means for determining at least a first coordinate identifying the position of a character pattern on said information pattern from the position of said mark,
   fourth means for sequentially cutting out partial patterns in an area related to said first coordinate determined by said third means from among the information picked up by said first means and determining the position coordinates for said partial patterns,
   fifth means for extracting the presence and at least a second coordinate identifying the position of said character pattern from among said sequentially cut out partial patterns,
   sixth means for recognizing character patterns contained in said sequentially cut out partial patterns and generating a signal representative thereof, and
   seventh means for selecting the signal output from said sixth means as the desired character recognition signal when the position coordinates of said sequentially cut out partial pattern in which is located said character recognized by said sixth means substantially match the position coordinates of said character pattern determined by said third and fifth means.

5. A pattern recognition device of claim 4 wherein said first means comprises a pickup means.

6. A pattern recognition device of claim 5 wherein said second means comprises means for obtaining the inclination of said mark, and said device further comprises a fourth means for compensating, by means of information indicating the inclination of said mark obtained by said second means, the inclination of the mark on the image picked up by said pickup means.

7. A pattern recognition device of claim 6 wherein said fourth means comprises a Wallaston prism.

8. A pattern recognition device of claim 4 wherein said second means comprises a fifth means for extracting the position of an end of said mark and a sixth means for extracting the center position in the width direction of said mark.

9. A pattern recognition device for recognizing the presence of a specific object pattern having at least a first and a second feature parts of specific shapes on an information pattern comprising:

first means for sequentially picking up the information pattern in a predetermined order;

second means for sequentially cutting out at least a first and a second partial patterns from among the information pattern picked up by said first means and determining position coordinates for said first and second partial patterns;

third means for extracting the presence of the first feature part and its position coordinates on the information pattern from the first partial sequentially cut out by said second means;

fourth means for extracting the presence of the second feature part and its position coordinates from the second partial pattern cut out by said second means when the position coordinates of the second partial pattern on the information pattern are in a first area related to the position coordinates of the first feature part thereon extracted by said third means;

fifth means for determining at least a first coordinate identifying the position of a third feature part from the position coordinates of at least one of said first and second feature parts;

sixth means for sequentially cutting out third partial patterns in an area related to said first coordinate determined by said fifth means from among the information picked up by said first means and determining the position coordinates for said third partial patterns;

seventh means for extracting the presence and at least a second coordinate identifying the position of said third feature part from among said sequentially cut out third partial patterns;

eighth means for recognizing feature parts contained in said sequentially cut out third partial patterns by matching them to known feature parts and generating a signal representative thereof; and ninth means for selecting the signal output from said eighth means as the desired character recognition when the position coordinates of said sequentially cut out third partial pattern in which said feature recognized by said eighth means is located substantially match the position coordinates of said third feature part determined by said fifth and seventh means.

10. A pattern recognition device according to claim 9, further comprising:

tenth means for determining the inclination of the object pattern in said information pattern from at least one of the position of the first and second feature parts; and eleventh means for compensating the inclination of the object pattern picked up by said first means by means of the inclination information received from said tenth means.

11. A pattern recognition device according to claim 10, wherein said second means includes shift register means.

12. A pattern recognition device as defined by claim 11, wherein said eleventh means comprises a Wallaston prism.

13. A pattern recognition device as defined in claim 10, wherein said position coordinates for said third partial patterns are center coordinates for said third partial patterns.

* * * * *